J. HEDDON.
REEL CLAMP FOR FISHING RODS.
APPLICATION FILED JUNE 5, 1908.
905,428.
Patented Dec. 1, 1908.
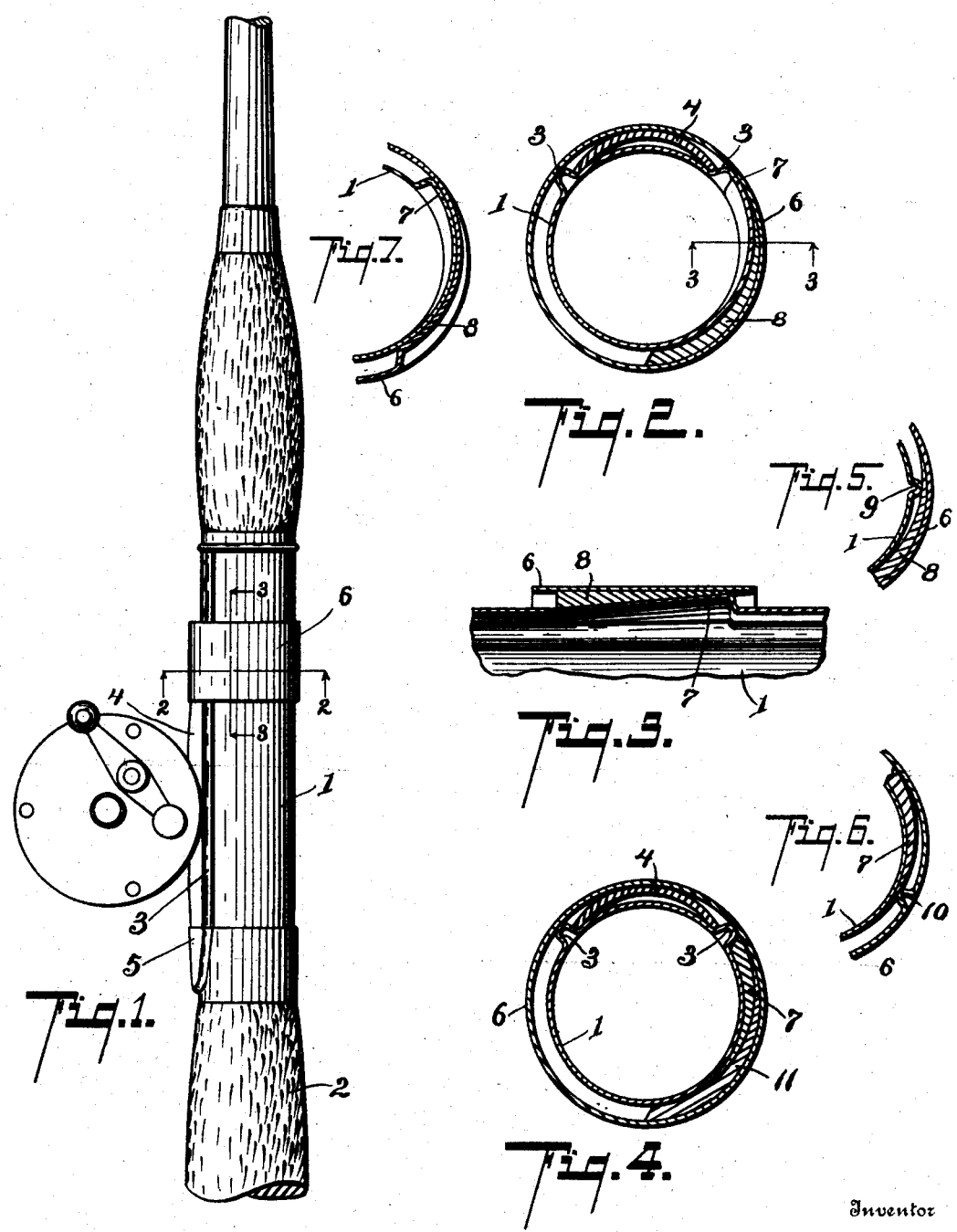

UNITED STATES PATENT OFFICE.

JAMES HEDDON, OF DOWAGIAC, MICHIGAN, ASSIGNOR TO JAMES HEDDON, CHARLES HEDDON, AND WILL T. HEDDON, COPARTNERS UNDER FIRM-NAME OF JAMES HEDDON & SONS, OF DOWAGIAC, MICHIGAN.

REEL-CLAMP FOR FISHING-RODS.

No. 905,428.　　　　Specification of Letters Patent.　　　　Patented Dec. 1, 1908.

Application filed June 5, 1908.　Serial No. 436,883.

*To all whom it may concern:*

Be it known that I, JAMES HEDDON, a citizen of the United States, residing at the city of Dowagiac, county of Cass, State of Michigan, have invented certain new and useful Improvements in Reel-Clamps for Fishing-Rods, of which the following is a specification.

This invention relates to improvements in reel clamps for fishing rods.

The main object of this invention is to provide an improved reel clamp for fishing rods by which a reel may be securely locked in position in its seat, and, at the same time, one which is very secure, the strain or pull on the reel tending to tighten rather than to loosen the clamp; and one which can be readily adjusted to secure or release the reel.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a detail side elevation of a structure embodying the features of my invention, a reel being shown in position. Fig. 2 is an enlarged cross section, taken on a line corresponding to line 2—2 of Fig. 1. Fig. 3 is an enlarged longitudinal section, taken on a line corresponding to line 3—3 of Figs. 1 and 2. Fig. 4 is an enlarged cross section corresponding to that of Fig. 2, of a modification, the cam member or projection on the support being a separate piece secured thereto rather than being formed integrally with the support, as is shown in Figs. 1, 2 and 3. Fig. 5 is a detail cross section of a further modification, the projection on the support not being cam-shaped. Fig. 6 is an enlarged cross section of a further modification, the projection on the clamping collar not being cam-shaped. Fig. 7 is a detail section showing a modification of the clamping sleeve, in which the clamping cam thereof is formed integrally therewith.

In the drawing, the sectional views are taken looking in the direction of the little arrows at the ends of the section lines, and similar numerals of reference refer to similar parts throughout the several views.

Referring to the drawing, the support 1 is preferably tubular and is mounted upon the base or handle section 2 of the fishing rod in the usual or any desired manner. The support is preferably provided with a pair of longitudinal ribs 3, which forms a seat for the base plate 4 of the reel. At one end of the reel seat, I provide a clamping member 5, which is preferably fixed, the same being socket-like and adapted to receive the end of the reel base plate. For the other end of the reel base plate, I provide an adjustable clamping collar 6, the same being adjustably mounted upon the support 1. The support 1 is provided with a cam projection 7, which is preferably longitudinally and transversely inclined, as appears in Figs. 2 and 3. This cam and also the longitudinal ribs 3 are preferably formed integrally with the support by pressing or punching up the same therein. It may, however, be formed of a separate piece and brazed thereto, as is shown in Fig. 4.

The collar 6 is provided with an internal cam 8 adapted to coact with the cam 7. This cam is preferably inclined longitudinally and transversely and is arranged oppositely to the cam 7, so that, by turning the collar, the cams are engaged, thereby effectively securing the collar in position. As the cams are inclined longitudinally of the support and collar—the cam of the support being inclined inwardly, while that of the collar is inclined outwardly—the tendency of any strain on the reel is to clamp the collar more firmly.

In the modification shown in Fig. 4, the cam 7 is brazed to the support, instead of being formed integrally therewith.

In the modification of Fig. 5, the projection 9 is provided to take the place of the cam projection 7. This, however, is not as effective as the cam projection 7 in securing the collar.

In the modification of Fig. 6, a projection 10 is shown in lieu of the cam projection 8 for the sleeve. While this is quite effective, it is not as desirable as the cam projection 8.

In the modification shown in Fig. 7, the cam 11 is shown formed integrally with the sleeve.

Other modifications in structural details will readily suggest themselves to those skilled in the art to which this invention relates. I do not attempt to show them in detail, as they will be suggested by these modifications shown, or be apparent to those skilled in this art.

I have illustrated and described my improvements in detail in the form preferred by me on account of the structural simplicity and economy. Further, I believe the form illustrated in the main views to be most efficient. I desire, however, to be understood as claiming the same specifically, as illustrated, as well as broadly.

Having thus described my invention, what I claim as new and desire to secure by Letters Patent is:

1. A reel base plate clamp comprising a support having a longitudinally and transversely inclined cam thereon, and a clamping collar for the reel base plate adjustably mounted on said support, said collar having an internal longitudinally and transversely inclined cam thereon arranged oppositely to the said cam on said support to coact therewith.

2. A reel base plate clamp comprising a support having a transversely inclined cam thereon, and a clamping collar for the reel base plate adjustably mounted on said support, said collar having an internal transversely inclined cam thereon arranged oppositely to the said cam on said support to coact therewith.

3. A reel base plate clamp comprising a support adapted to receive a reel base plate and having a fixed cam thereon, and a clamping collar for the reel base plate rotatably mounted on said support, said collar having an internal cam fixed thereon arranged oppositely to the said cam on said support to coact therewith.

4. A reel base plate clamp comprising a support having a cam thereon, said cam being punched up from said support, and a clamping collar for the reel base plate adjustably mounted on said support, said collar having an internal cam thereon arranged oppositely to the said cam on said support to coact therewith.

5. A reel base plate clamp comprising a support having a cam thereon, said cam being punched up from said support, and a clamping collar for the reel base plate adjustably mounted on said support, said collar having an internal projection adapted to coact with said cam.

6. A reel base plate clamp comprising a support adapted to receive a reel base plate, and a clamping collar for the reel base plate rotatably mounted on said support, said collar having an internal cam thereon arranged transversely of its longitudinal axis; and a projection on said support arranged to be engaged by said cam.

7. A reel base plate clamp comprising a support adapted to receive a reel base plate, and a clamping collar for the reel base plate mounted on said support to be rotatably and longitudinally adjusted thereon, said collar having a cam thereon arranged transversely to its longitudinal axis and adapted to be brought into clamping engagement with the support by the rotation of the collar, said support being provided with a portion coacting with said cam whereby said collar may be adjusted longitudinally upon the support and clamped in its adjusted position thereon independently of the reel base plate.

8. A reel base plate clamp comprising a support adapted to receive a reel base plate, a clamping collar for the reel base plate rotatably mounted on said support; and a cam on said support arranged transversely to the longitudinal axis of said collar.

9. A reel base plate clamp comprising a support having a longitudinal and transversely inclined cam thereon, and a clamping collar for the reel base plate having an internal projection adapted to be brought into engagement with said cam.

10. A reel base plate clamp comprising a support adapted to receive a reel base plate and having a fixed cam thereon, and a clamping collar for the reel base plate having an internal projection adapted to be brought into engagement with said fixed cam on said support.

11. A reel base plate clamp comprising a support adapted to receive a reel base plate and having a fixed cam thereon, and a clamping collar for the reel base plate rotatably mounted on said support and having a portion adapted to be brought into engagement with said cam on said support by the rotation of said collar.

12. A reel base plate clamp comprising a support adapted to receive the reel base plate and having a wedge portion rigidly fixed thereon; and a clamping collar mounted upon said support and adapted to be brought into engagement with the said wedge portion thereon.

In witness whereof, I have hereunto set my hand and seal in the presence of two witnesses.

JAMES HEDDON. [L. S.]

Witnesses:
 LUELLA G. GREENFIELD,
 GERTRUDE TALLMAN.